US012731563B2

(12) United States Patent
Yoshino

(10) Patent No.: US 12,731,563 B2
(45) Date of Patent: Sep. 8, 2026

(54) ELECTRONIC PERCUSSION INSTRUMENT, PERCUSSION INSTRUMENT SET, AND METHOD FOR SECURING STRUCK SURFACE PART

(71) Applicant: Roland Corporation, Shizuoka (JP)

(72) Inventor: Kiyoshi Yoshino, Hamamatsu (JP)

(73) Assignee: Roland Corporation, Shizuoka (JP)

( * ) Notice: Subject to any disclaimer, the term of this patent is extended or adjusted under 35 U.S.C. 154(b) by 241 days.

(21) Appl. No.: 18/291,222

(22) PCT Filed: Jul. 14, 2022

(86) PCT No.: PCT/JP2022/027667
§ 371 (c)(1),
(2) Date: Jan. 23, 2024

(87) PCT Pub. No.: WO2023/013380
PCT Pub. Date: Feb. 9, 2023

(65) Prior Publication Data

US 2025/0104672 A1 Mar. 27, 2025

(30) Foreign Application Priority Data

Aug. 6, 2021 (JP) ................................ 2021-129683

(51) Int. Cl.
*G10D 13/02* (2020.01)

(52) U.S. Cl.
CPC .................................. *G10D 13/02* (2013.01)

(58) Field of Classification Search
USPC .......................................................... 84/104
See application file for complete search history.

(56) References Cited

U.S. PATENT DOCUMENTS 5,554,812 A * 9/1996 Donohoe ............... G10D 13/02
84/413
5,998,716 A * 12/1999 Marquez ................ G10D 13/20
84/411 P (Continued)

FOREIGN PATENT DOCUMENTS

CN 102376299 3/2012
CN 104424927 3/2015

(Continued)

OTHER PUBLICATIONS

"International Search Report (Form PCT/ISA/210) of PCT/JP2022/027667", mailed on Oct. 11, 2022, with English translation thereof, pp. 1-5.

(Continued)

*Primary Examiner* — Eduardo Castilho
(74) *Attorney, Agent, or Firm* — JCIPRNET

(57) ABSTRACT

Electronic percussion instruments 3*a* to 3*g* each comprise a struck surface part 30 having a dome-shaped struck surface 30*a* and formed into a net shape, and a ring-shaped frame 31 connected to the outer edge of the struck surface part 30, and a region on the back surface 30*b* side of the struck surface part 30 is open. Consequently, unlike a case where the back surface side of a struck surface is surrounded by a cylindrical shell, for example, like conventional electronic percussion instruments simulating a drum, it is possible to prevent other members from being resonant with vibrations when the struck surface 30*a* is hit. Therefore, hit sound can be effectively reduced.

14 Claims, 4 Drawing Sheets

(56) References Cited

U.S. PATENT DOCUMENTS

| | | | | |
|---|---|---|---|---|
| 7,781,661 | B2 * | 8/2010 | Rogers | G10D 13/03 84/411 R |
| 9,460,699 | B2 * | 10/2016 | Kanayama | G10H 3/146 |
| 10,102,833 | B1 * | 10/2018 | May | G10H 3/146 |
| 2002/0112593 | A1 * | 8/2002 | Yanase | G10D 13/02 84/411 P |
| 2004/0159223 | A1 * | 8/2004 | Kiyono | G10D 13/02 84/723 |
| 2006/0219092 | A1 * | 10/2006 | Mishima | G10H 3/06 84/724 |
| 2008/0163739 | A1 * | 7/2008 | Mori | G10D 13/28 84/421 |
| 2008/0282867 | A1 * | 11/2008 | Liu | G10D 13/02 84/411 P |
| 2013/0312585 | A1 * | 11/2013 | Yunbin | G10D 13/24 427/372.2 |
| 2014/0116229 | A1 * | 5/2014 | Mori | G10D 13/26 84/415 |
| 2018/0082667 | A1 * | 3/2018 | Bean | G10D 13/02 |
| 2019/0172435 | A1 * | 6/2019 | Zhong | G10D 13/26 |
| 2019/0197998 | A1 * | 6/2019 | Yoshino | G10D 13/063 |
| 2019/0213983 | A1 * | 7/2019 | Motohashi | G10D 13/20 |
| 2021/0090531 | A1 * | 3/2021 | Gorman | G10D 13/24 |
| 2021/0118417 | A1 * | 4/2021 | Izumi | G10D 13/02 |

FOREIGN PATENT DOCUMENTS

| | | | | |
|---|---|---|---|---|
| CN | 204516332 | | 7/2015 | |
| CN | 110197651 | | 9/2019 | |
| CN | 112687249 | | 4/2021 | |
| EP | 3531414 | A1 * | 8/2019 | G10D 13/26 |
| JP | S5532867 | | 3/1980 | |
| JP | S5937828 | | 10/1984 | |
| JP | H1020854 | | 1/1998 | |
| JP | 2000132164 | | 5/2000 | |
| JP | 2006259193 | | 9/2006 | |
| JP | 2014092588 | | 5/2014 | |
| JP | 2021067752 | | 4/2021 | |

OTHER PUBLICATIONS

"Office Action of China Counterpart Application", issued on Mar. 18, 2026, with English translation thereof, pp. 1-17.

* cited by examiner

ELECTRONIC PERCUSSION INSTRUMENT, PERCUSSION INSTRUMENT SET, AND METHOD FOR SECURING STRUCK SURFACE PART

CROSS-REFERENCE TO RELATED APPLICATION

This application is a 371 application of the International PCT application serial no. PCT/JP2022/027667, filed on Jul. 14, 2022, which claims the priority benefits of Japan Patent Application No. 2021-129683, filed on Aug. 6, 2021. The entirety of each of the above-mentioned patent applications is hereby incorporated by reference herein and made a part of this specification.

TECHNICAL FIELD

The present invention relates to an electronic percussion instrument, and more particularly relates to an electronic percussion instrument and a method for securing a struck surface part that are capable of reducing a hit sound.

RELATED ART

Patent Document 1 describes a technique for securing a swollen struck surface part (drum head) to a shell with a frame. In this technique, the struck surface part is formed into a net shape, and air passes through the mesh of the struck surface part during hitting, thereby reducing a hit sound.

CITATION LIST

Patent Document

[Patent Document 1] specification of Chinese Utility Model No. 204516332 (for example, paragraph 0022, FIG. 1, and FIG. 2)

SUMMARY OF INVENTION

However, in the conventional technique described above, the region on the back surface side of the struck surface part is surrounded by a cylindrical shell, and the shell resonates with vibrations when the struck surface part is hit, which results in a problem that the hit sound cannot be sufficiently reduced.

The present invention has been made to solve the above-mentioned problem, and an object of the present invention is to provide an electronic percussion instrument and a method for securing a struck surface part that are capable of reducing a hit sound.

SUMMARY OF INVENTION

An electronic percussion instrument of the present invention includes: a struck surface part formed into a dome shape and a net shape; and a frame being annular and connected to an outer edge of the struck surface part.

A method for securing a struck surface part of the present invention is a method for securing a struck surface part to a frame of an electronic percussion instrument, in which the struck surface part is formed into a net shape, and the frame is annular and connected to an outer edge of the struck surface part, and the method includes: securing the struck surface part in a dome shape to the frame.

DESCRIPTION OF EMBODIMENTS

Figure 1:
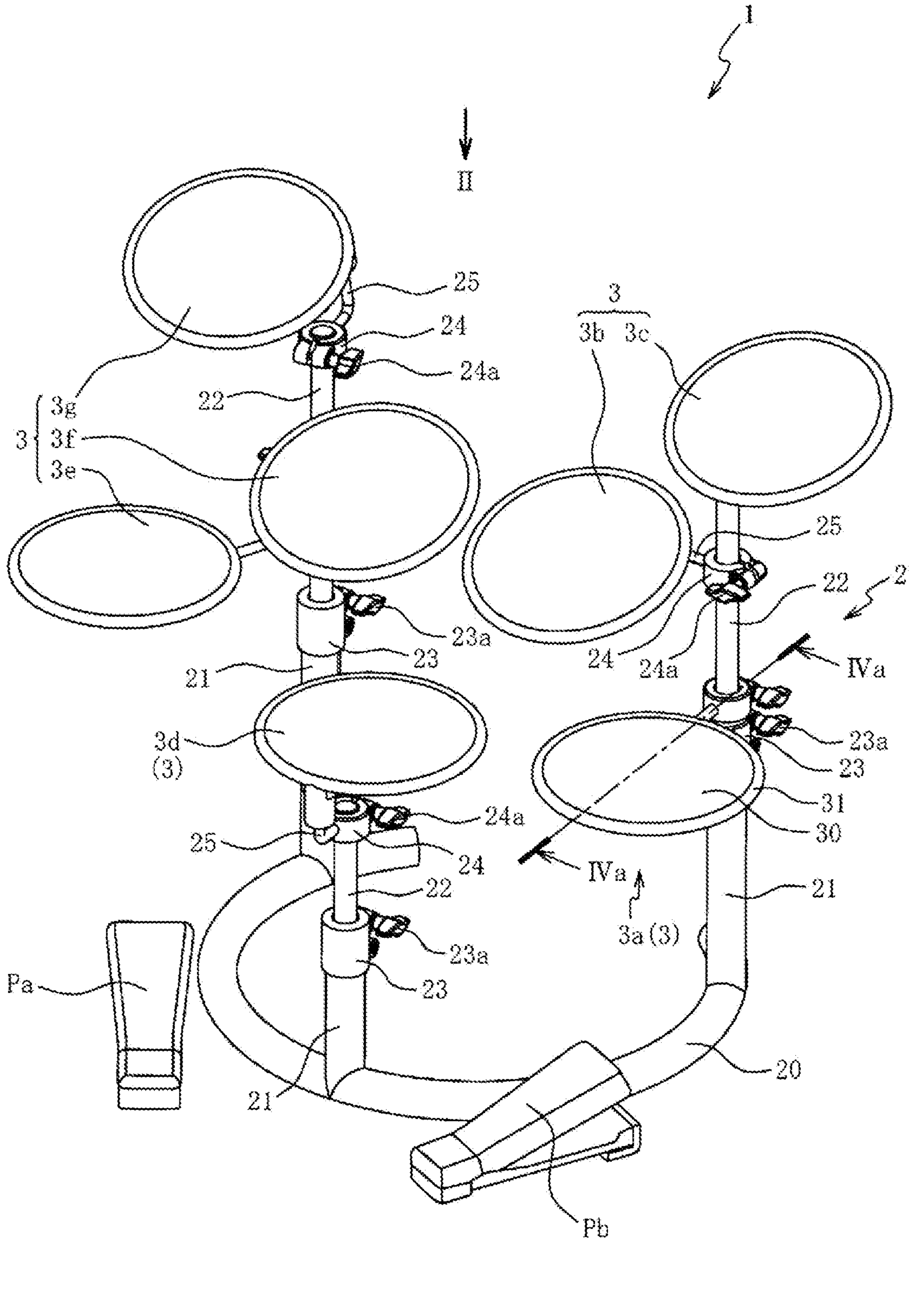
FIG. 1 is a perspective view of a percussion instrument set in an embodiment.

Hereinafter, preferred embodiments will be described with reference to the accompanying drawings. First, the overall configuration of a percussion instrument set 1 will be described with reference to FIG. 1 and FIG. 2. FIG. 1 is a perspective view of the percussion instrument set 1 in an embodiment, and FIG. 2 is a top view of the percussion instrument set 1 as viewed in the direction II of FIG. 1.

Figure 2:
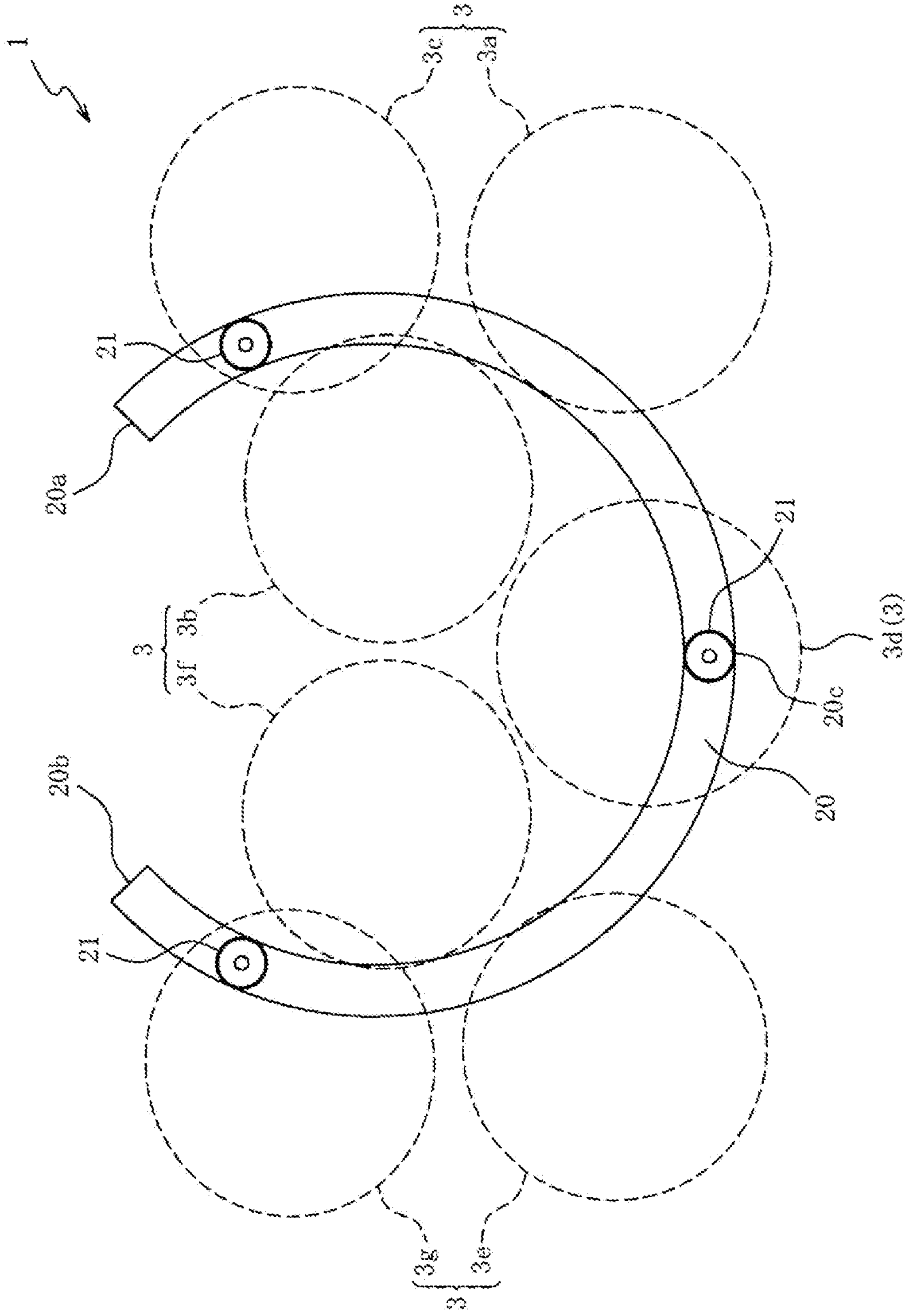
FIG. 2 is a top view of the percussion instrument set as viewed in the direction II of FIG. 1.

In FIG. 2, the outer shapes of electronic percussion instruments 3*a* to 3*g* are illustrated with broken lines, a base pipe 20 and support pipes 21 are illustrated with solid lines, and illustration of other members is omitted. Additionally, in the following description, the front side as seen from the player when using the percussion instrument set 1 is referred to as the front side of the percussion instrument set 1, the opposite side is referred to as the rear side, and the right side and left side as seen from the player are referred to as the right side and left side of the percussion instrument set 1.

As shown in FIG. 1, the percussion instrument set 1 includes a stand 2 and a plurality of (seven in this embodiment) electronic percussion instruments 3 supported by the stand 2, and simulates a drum set.

The stand 2 includes a cylindrical base pipe 20 that serves as the base. The base pipe 20 is formed into a C shape with a cut portion facing the rear side, and the support pipes 21 extend upward from three locations: a front end portion and left and right rear end portions of the base pipe 20. A lower end portion of the support pipe 21 is fixed to the base pipe 20 by a fastening means (such as a screw) not shown.

The support pipe 21 is formed into a cylindrical shape with an open upper end, and a support column 22 is inserted into each of the three support pipes 21. A C-shaped clamp 23 having a butterfly bolt 23*a* is fixed to the upper end of the support pipe 21, and by tightening this clamp 23 with the butterfly bolt 23*a*, the insertion state of the support column 22 into the support pipe 21 is secured.

A C-shaped clamp 24 having a butterfly bolt 24*a* is attached to the support column 22, and an arm 25 for supporting the electronic percussion instrument 3 is fixed to this clamp 24. The arm 25 is formed into an L shape that includes a horizontal portion extending in a substantially horizontal direction from the outer circumferential surface of the clamp 24, and a bent portion bent upward from the tip of the horizontal portion.

The electronic percussion instrument 3 is supported by the support column 22 via the arm 25 and the clamp 24 by securing the electronic percussion instrument 3 to the bent portion of the arm 25. Thus, the arrangement and height of the electronic percussion instrument 3 is easily adjustable by loosening the butterfly bolt 24*a* of the clamp 24 and rotating the clamp 24 with respect to the support column 22 or adjusting the mounting height of the clamp 24 with respect to the support column 22.

A plurality of electronic percussion instruments 3 are supported on each support column 22 by such clamps 24 and arms 25. In the following description, among the plurality of electronic percussion instruments 3, three supported by the support column 22 at the rear end portion on the right side of the base pipe 20 are referred to as electronic percussion instruments 3*a* to 3*c*, one supported by the support column 22 on the front end side of the base pipe 20 is referred to as electronic percussion instrument 3*d*, and three supported by the support column 22 at the rear end portion on the left side of the base pipe 20 are referred to as electronic percussion instruments 3*e* to 3*g*. The electronic percussion instrument 3*a* simulates a floor tom, 3*b* and 3*f* simulate toms, 3*c* and 3*g* simulate cymbals, 3*d* simulates a snare drum, and 3*e* simulates a hi-hat.

The electronic percussion instruments 3*a* to 3*g* each include a struck surface part 30 to be hit by the player, and an annular frame 31 is connected to the outer edge portion of the struck surface part 30. The electronic percussion instruments 3*a* to 3*g* are each provided with an impact sensor 33 (see FIG. 3B) that detects vibrations when the struck surface part 30 is hit. The detection results obtained by the impact sensors 33 of the electronic percussion instruments 3*a* to 3*g* are output to a sound source (not shown), and the sound source generates musical sound signals based on the detection results. Electronic sounds based on the generated musical sound signals are output to an amplifier and a speaker (both not shown) so that musical sounds corresponding to the instruments simulated by the electronic percussion instruments 3*a* to 3*g* are emitted from the amplifier and the speaker.

Further, the percussion instrument set 1 is provided with a pair of pedal devices Pa and Pb, and these pedal devices Pa and Pb are devices for simulating the performance of a hi-hat and a bass drum. Thus, by hitting the electronic percussion instrument 3*e* while stepping on the pedal device Pa, a musical sound corresponding to the closed or open state of the hi-hat is generated, and by stepping on the pedal device Pb, a musical sound simulating hitting on the bass drum is generated.

As shown in FIG. 2, the support pipe 21 that supports the electronic percussion instrument 3*d* simulating a snare drum is arranged at the central portion of the base pipe 20. More specifically, if the central portion between one end 20*a* and the other end 20*b* of the C-shaped base pipe 20 is defined as a front end 20*c* of the base pipe 20, the electronic percussion instrument 3*d* is supported by the support pipe 21 located at this front end 20*c*. Since the electronic percussion instrument 3*d* that simulates a snare drum can be arranged near the player, the percussion instrument set 1 allows the player to suitably perform a performance that simulates a drum set.

In this way, in this embodiment, the electronic percussion instruments 3*a* to 3*g* are supported by one support pipe 21 (support column 22) on the front end side (player side) and two support pipes 21 on the right rear side and the left rear side (right rear side and left rear side when viewed from the player side) of the percussion instrument set 1. When such three support pipes 21 are supported by the base pipe 20, the base pipe 20 may also be formed into a circular shape, for example. However, in such a configuration, the front-rear dimension of the base pipe 20 increases so the space for installing the percussion instrument set 1 increases.

In contrast thereto, the base pipe 20 of this embodiment is formed into a C shape with both ends 20*a* and 20*b* facing toward the rear side of the percussion instrument set 1, which makes it possible to reduce the front-rear dimension of the base pipe 20 while supporting three support pipes 21 on the sides of both ends 20*a* and 20*b* and the side of the front end 20*c* of the base pipe 20. Therefore, the space for installing the percussion instrument set 1 can be reduced.

Moreover, since the base pipe 20 is formed into a C shape, the grounding region (area) of the base pipe 20 can be expanded, for example, compared to a case where the support pipe 21 on the front side and the two support pipes on the rear side of the percussion instrument set 1 are linearly connected and formed into a V shape. Therefore, the electronic percussion instruments 3*a* to 3*g* can be stably supported by the base pipe 20.

Figure 3A:
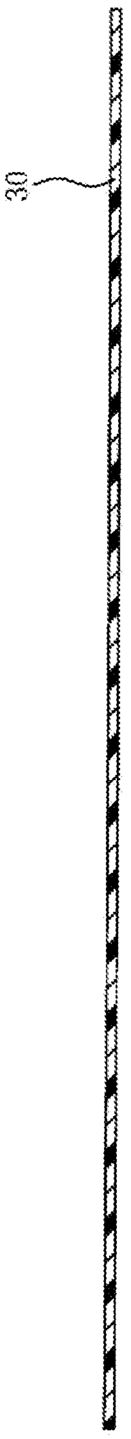
FIG. 3A is a cross-sectional view of a struck surface part.
Figure 3B:
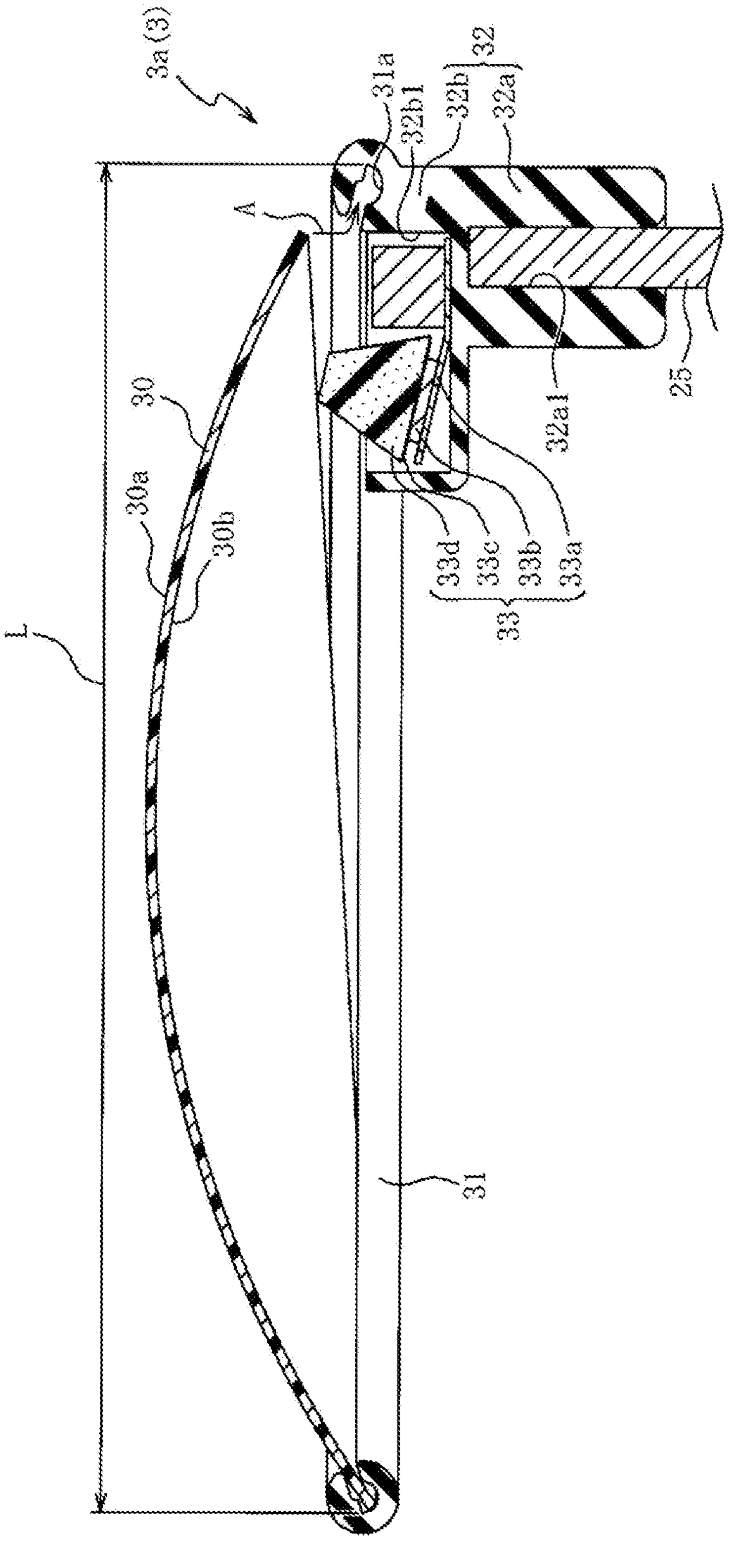
FIG. 3B is a cross-sectional view of an electronic percussion instrument showing how the struck surface part is attached to a frame.
Figure 4A:
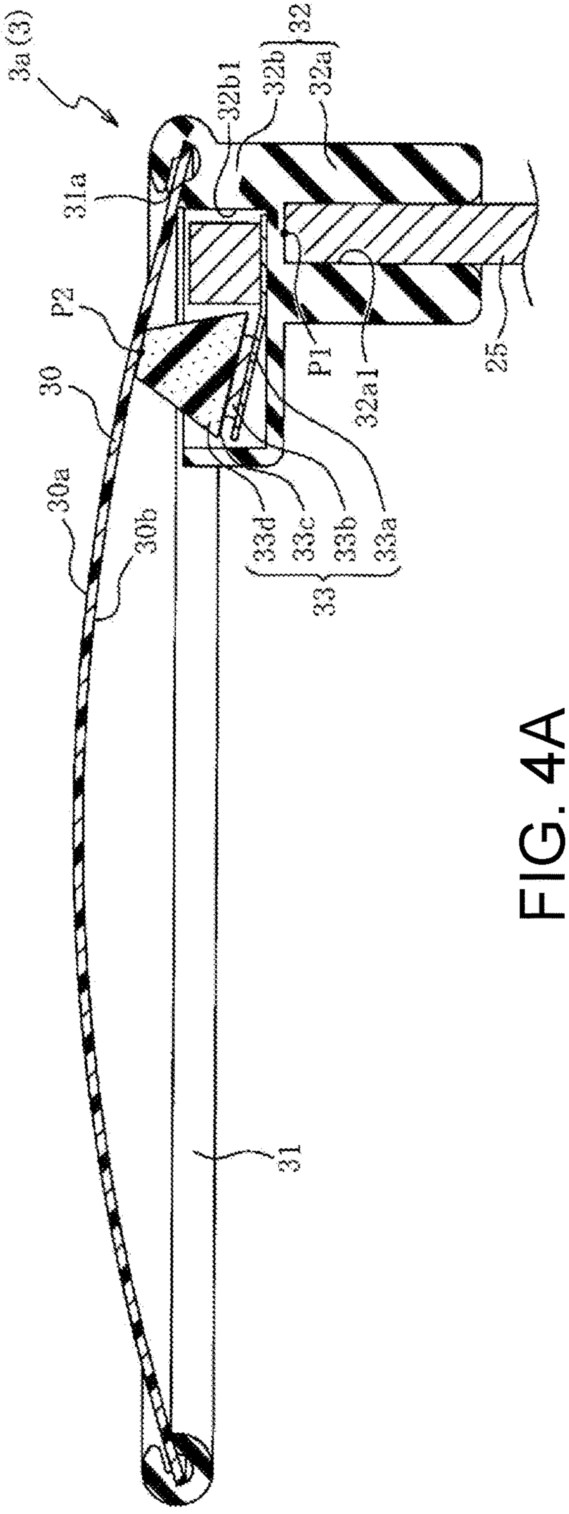
FIG. 4A is a cross-sectional view of the electronic percussion instrument along the line IVa-IVa of FIG. 1.
Figure 4B:
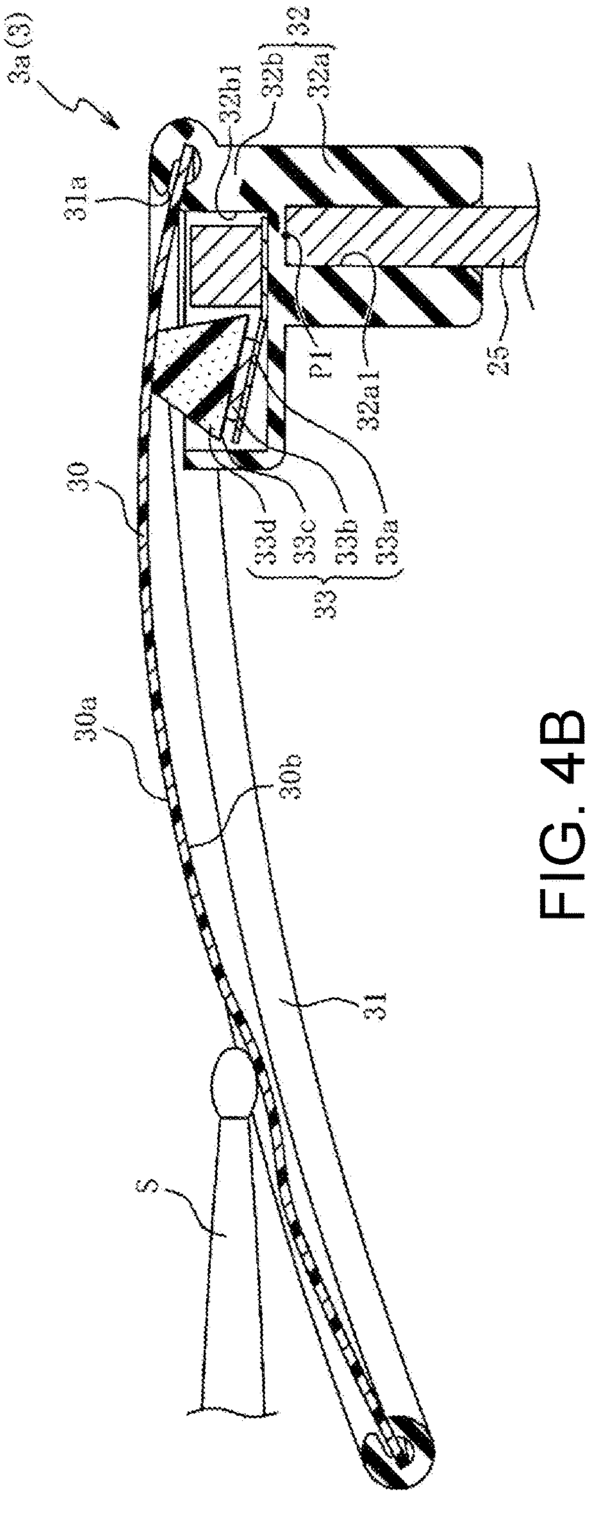
FIG. 4B is a cross-sectional view of the electronic percussion instrument showing how the struck surface of the struck surface part is hit from the state of FIG. 4A.

Next, the detailed configuration of the electronic percussion instrument 3 will be described with reference to FIG. 3A, FIG. 3B, FIG. 4A, and FIG. 4B, taking the electronic percussion instrument 3*a* as an example, but the electronic percussion instruments 3*b* to 3*g* have the same configuration as the electronic percussion instrument 3*a*. FIG. 3A is a cross-sectional view of the struck surface part 30, and FIG. 3B is a cross-sectional view of the electronic percussion instrument showing how the struck surface part 30 is attached to the frame 31. FIG. 4A is a cross-sectional view of the electronic percussion instrument 3*a* along the line IVa-IVa of FIG. 1, and FIG. 4B is a cross-sectional view of the electronic percussion instrument 3*a* showing how the struck surface 30*a* of the struck surface part 30 is hit from the state of FIG. 4A. It should be noted that FIG. 3A shows a cross section of the struck surface part 30 before being attached to the frame 31, and FIG. 3B and FIG. 4A and FIG. 4B show a cross section cut along a plane including the axis of the electronic percussion instrument 3*a*.

As shown in FIG. 3A, the struck surface part 30 of the electronic percussion instrument 3*a*, before being attached to the frame 31, is formed into a flat disc shape. A recess 31*a* that is recessed radially outward is formed on the inner circumferential surface of the frame 31 over the entire circumference of the frame 31. Since the outer diameter of the struck surface part 30 is formed larger than the inner diameter L of the inner circumferential surface of the recess 31*a* (the inner diameter of the frame 31), the disc-shaped struck surface part 30 is fitted into the recess 31*a* while being deformed (see the arrow A of FIG. 3B), thereby forming the dome (hemispherical) struck surface 30*a*.

The struck surface part 30 is formed using a polyester mesh (net-shaped material). The mesh constituting the struck surface part 30 has enough rigidity to maintain the dome shape of the struck surface 30*a* (the dome shape is not deformed by its own weight) in a state where the struck surface part 30 is fitted into the recess 31*a* (a state before the struck surface 30*a* is hit).

The mesh with such rigidity may have a wire diameter of 600 μm to 1200 μm and a mesh number (number of threads per inch) of 5.1 to 13 when made of polyester, for example. In addition, the mesh may have a wire diameter of 600 μm to 1200 μm and a mesh number of 5.8 to 9.7 when made of nylon, for example.

Furthermore, the weaving method of the mesh may be plain weave or twill weave, which is not particularly limited. That is, the wire diameter and the mesh number may be appropriately set according to the material (type of resin)

and weaving method so as to maintain the dome shape in the state of being attached to the frame 31 (recess 31*a*).

A holder 32 for supporting the electronic percussion instrument 3*a* on the arm 25 is integrally formed on the frame 31. The holder 32 includes a mounting portion 32*a* that is mounted on the arm 25, and a fixing portion 32*b* which is formed on the top of the mounting portion 32*a* and to which the impact sensor 33 is fixed. The mounting portion 32*a* and the fixing portion 32*b* are integrally formed.

A press-fit hole 32*al* having an inner diameter smaller than the outer diameter of the arm 25 is formed in the lower surface of the columnar mounting portion 32*a*, and the arm 25 is press-fitted into this press-fit hole 32*a*1. The fixing portion 32*b* is formed into a substantially elliptical shape (oval shape) that protrudes radially inward from the upper end of the mounting portion 32*a*. Although not shown, the dimension in the circumferential direction of the fixing portion 32*b* is substantially the same as the outer diameter of the mounting portion 32*a*.

The impact sensor 33 is housed in a housing portion 32*b*1 recessed in the upper surface of the fixing portion 32*b*. The impact sensor 33 includes a plate 33*a* fixed to the bottom surface of the housing portion 32*b*1, and a disc-shaped double-sided tape 33*b* having cushioning properties is adhered to the upper surface of the plate 33*a*. A sensor 33*c*, which is a disc-shaped piezoelectric element, is adhered to the upper surface of this double-sided tape 33*b*, and a cushion 33*d* is adhered to the upper surface of the sensor 33*c*. The cushion 33*d* is formed into a truncated cone shape using sponge, and the upper surface of the cushion 33*d* comes into contact with a back surface 30*b* of the struck surface part 30, allowing vibrations generated when the struck surface part 30 is hit to be transmitted to the sensor 33*c* via the cushion 33*d*.

As shown in FIG. 4B, when the player hits the struck surface 30*a* of the electronic percussion instrument 3*a* with a stick S or the like, the struck surface part 30 is bent (recessed) at the hit position so that the force of restoring the bent state to the dome shape can provide the player with a responsive hitting feeling. Further, since the struck surface part 30 is formed using a mesh, and air passes through the mesh of the struck surface part 30 during hitting, the hit sound can be reduced.

Furthermore, the electronic percussion instrument 3*a* of this embodiment does not have a member surrounding the region on the side of the back surface 30*b* of the struck surface part 30, and the region is open. As a result, unlike a case where the side of the back surface 30*b* of the struck surface part 30 is surrounded by a cylindrical shell, as in the conventional electronic percussion instrument that simulates a drum, for example, the electronic percussion instrument 3*a* of this embodiment is capable of suppressing other members from resonating with vibrations when the struck surface 30*a* is hit. That is, since the vibrations generated when the struck surface part 30 is hit are diffused around the frame 31 (electronic percussion instrument 3*a*), the hit sound can be effectively reduced.

Also, a downward load is applied to the frame 31 due to the hit on the struck surface part 30, but due to this load, the frame 31 also deforms to bend as a whole. This is because the frame 31 is supported in a cantilevered manner by the arm 25 via the holder 32, and what is more, the frame 31 is formed using a material (rubber or soft resin) having an elastic modulus that allows the frame 31 to be bent and deformed by the hit when the struck surface part 30 is hit. As the frame 31 has such elasticity, the impact when the player contacts the frame 31 can be alleviated.

On the other hand, if the frame 31 is made of an elastically deformable material, the impact force on the struck surface part 30 may be absorbed by the deformation of the frame 31, resulting in a slight loss of feeling when hitting. However, since the struck surface part 30 is formed into a dome shape, as described above, even if the impact force is absorbed by the elastic deformation of the frame 31, the repulsive force of the struck surface part 30 can provide a sufficiently responsive hitting feeling. In other words, forming the struck surface part 30 into a dome shape and configuring the frame 31 to be elastically deformable during hitting can provide a responsive hitting feeling as well as ensure safety when the player contacts the frame 31.

Here, the support position where the electronic percussion instrument 3*a* is supported by the holder 32, that is, the center of the upper end surface of the arm 25, is defined as a support position PI of the electronic percussion instrument 3*a*. When the frame 31 is elastically deformed with this support position PI as a fulcrum, the frame 31 is vertically displaced significantly at a position away from the support position PI, such as the center of the frame 31 or the end opposite to the holder 32 across the center (the end on the left side of FIG. 4A and FIG. 4B). If the cushion 33*d* is in contact with the back surface 30*b* of the struck surface part 30 in such a region where the displacement of the frame 31 is large, the cushion 33*d* may be excessively compressed by the struck surface part 30 when the struck surface part 30 is hit, or the struck surface part 30 may be separated from the cushion 33*d*.

In contrast thereto, in this embodiment, the cushion 33*d* contacts the back surface 30*b* of the struck surface part 30 in a region near the support position P1 of the electronic percussion instrument 3*a*, that is, in a region where the amount of vertical displacement of the frame 31 is relatively small. Thus, even if the frame 31 is elastically deformed during hitting, the cushion 33*d* can be prevented from being excessively compressed by the struck surface part 30 and the struck surface part 30 can be prevented from being separated from the cushion 33*d*. Therefore, the contact state between the struck surface part 30 and the cushion 33*d* can be stabilized, so that the sensor 33*c* can accurately detect a hit on the struck surface part 30.

Further, the adhesive surface, which is the upper surface of the plate 33*a* of the impact sensor 33 and to which the sensor 33*c* is adhered via the double-sided tape 33*b*, is inclined along the curve of the back surface 30*b* of the struck surface part 30. Specifically, the upper surface of the plate 33*a* (the adhesive surface of the sensor 33*c*) is substantially parallel to the tangential direction of the struck surface part 30 (back surface 30*b*) at a contact position P2 between the back surface 30*b* of the struck surface part 30 and the cushion 33*d*. Thereby, the truncated conical cushion 33*d* is easily compressed in the axial direction when the cushion 33*d* is compressed by the struck surface part 30 due to the elastic deformation of the frame 31. Since the cushion 33*d* is appropriately compressed easily, the sensor 33*c* is capable of accurately detecting the hit on the struck surface part 30.

In addition, as the impact sensor 33 is supported using the holder 32, the holder 32 can have a function of supporting the frame 31 (electronic percussion instrument 3*a*) on the arm 25 and a function of supporting the impact sensor 33 near the support position P1 of the electronic percussion instrument 3*a*. As a result, it is not necessary to separately provide a part for supporting the impact sensor 33 near the support position P1 of the electronic percussion instrument 3*a* in addition to the holder 32, so the structure of the electronic percussion instrument 3*a* can be simplified.

Furthermore, the holder 32 and the frame 31 are integrally formed, and like the frame 31, the holder 32 also has predetermined elasticity. In this embodiment, the electronic percussion instrument 3*a* is supported on the stand 2 by utilizing the elasticity of the holder 32 to press-fit the arm 25 into the press-fit hole 32*al* of the holder 32, which makes it easy to attach or detach the electronic percussion instrument 3*a* to or from the arm 25 and adjust the arrangement of the electronic percussion instrument 3*a*. Further, since parts such as the butterfly bolt for fixing the holder 32 to the arm 25 can be omitted, it is possible to prevent the player from contacting such parts and to reduce the number of parts.

Here, in this embodiment, the outer edge portion of the struck surface part 30 is not joined to the inner surface of the recess 31*a* of the frame 31 with an adhesive or the like, and the struck surface part 30 can be attached to and detached from the frame 31. This is to facilitate maintenance (replacement, etc.) of the struck surface part 30.

On the other hand, in the case of the configuration in which the struck surface part 30 is not joined to the recess 31*a*, there is a risk that the struck surface part 30 may fall off from the recess 31*a* due to deformation of the struck surface part 30 and the frame 31 during hitting. However, as mentioned above, the disc-shaped struck surface part 30, which has an outer diameter larger than the diameter L of the inner circumferential surface of the recess 31*a* (the inner diameter of the frame 31), is deformed into a dome shape when fitted into the recess 31*a* (see FIG. 3B). Thus, in the installed state where the struck surface part 30 is fitted into the recess 31*a*, a restoring force is generated to return the struck surface part 30 to a disc shape. Therefore, this embodiment can suppress the struck surface part 30 from falling off from the recess 31*a* due to the deformation of the struck surface part 30 and the frame 31 during hitting, compared to a case where the struck surface part 30 molded into a dome shape in advance is fitted into the recess 31*a*.

Although the present invention has been described based on the above embodiments, the present invention is not limited to the above embodiments, and it can be easily inferred that various improvements and modifications can be made without departing from the spirit of the present invention.

Although the above embodiment illustrates a case where the electronic percussion instruments 3*a* to 3*g* have the same configuration, the present invention is not necessarily limited thereto. For example, the elastic moduli of the frames 31 of the electronic percussion instruments 3*a* to 3*g* may be set to different values to vary the feeling when hitting the electronic percussion instruments 3*a* to 3*g*.

Specifically, for example, the elastic moduli of the frames 31 of the electronic percussion instruments 3*c*, 3*e*, and 3*g* that simulate acoustic cymbals or hi-hats may be set smaller than the elastic moduli of the frames 31 of the electronic percussion instruments 3*a*, 3*b*, 3*d*, and 3*f* (see FIG. 1) that simulate acoustic drums. That is, the frames 31 of the electronic percussion instruments 3*a*, 3*b*, 3*d*, and 3*f* may have an elastic modulus that does not substantially deform during hitting (the deformation as shown in FIG. 4B does not occur), and the frames 31 of the electronic percussion instruments 3*c*, 3*e*, and 3*g* may have an elastic modulus that allows bending and deformation by hitting (the deformation as shown in FIG. 4B occurs).

This configuration can provide a hitting feeling similar to that of an acoustic drum when hitting the electronic percussion instruments 3*a*, 3*b*, 3*d*, and 3*f*. On the other hand, as the frames 31 of the electronic percussion instruments 3*c*, 3*e*, and 3*g* are elastically deformed during hitting, the deformation of the frame 31 can simulate a displacement of swing of the entire cymbal, which makes it possible to provide a hitting feeling similar to that of an acoustic cymbal.

Although the above embodiment illustrates a case where the base pipe 20 is formed into a C shape with both ends 20*a* and 20*b* facing toward the rear side of the percussion instrument set 1, the present invention is not necessarily limited thereto. For example, the base pipe 20 may be formed into a V shape that linearly connects the support pipe 21 on the front side and the two support pipes on the rear side of the percussion instrument set 1. Further, the base pipe 20 may also be formed into a circular shape. That is, the shape of the base pipe 20 is not limited to the above-described form as long as the base pipe 20 can support one or more electronic percussion instruments 3*a* to 3*g* via the support pipes 21 and the support columns 22.

Although the above embodiment illustrates a case where the electronic percussion instruments 3*a* to 3*g* are each supported by the L-shaped arm 25, the present invention is not necessarily limited thereto. For example, the electronic percussion instruments 3*a* to 3*g* may be supported by rods with no bent portions.

Although the above embodiment illustrates a case where the disc-shaped struck surface part 30, which has an outer diameter larger than the diameter L of the inner circumferential surface of the recess 31*a* (the inner diameter of the frame 31), is deformed into a dome shape when fitted into the recess 31*a*, the present invention is not necessarily limited thereto. For example, the struck surface part 30 formed into a dome shape in advance may be fitted into the recess 31*a*, or the struck surface part 30 and the frame 31 may be integrally molded by die molding. In addition, the struck surface part 30 may be joined to the inner surface of the recess 31*a* with an adhesive.

Although the above embodiment illustrates a case where the electronic percussion instrument 3*a* (frame 31) is supported in a cantilevered manner on the arm 25 by the holder 32 (at a position eccentric from the center of the frame 31), the present invention is not necessarily limited thereto. For example, the fixing portion 32*b* of the holder 32 may be extended to be near the center of the frame 31, and the tip of the extended portion may be supported by the arm 25. In the case of this configuration, the impact sensor 33 may be supported at the tip side of the extended portion of the holder 32, and the cushion 33*d* may be brought into contact with the center of the struck surface part 30.

Although the above embodiment illustrates a case where the frame 31 has elasticity that allows the frame 31 to be bent and deformed by a hit, and the frame 31 and the holder 32 are integrally formed, the present invention is not necessarily limited thereto. For example, the frame 31 and the holder 32 may be formed using hard resin, a metal material, wood, or the like, and the frame 31 may not be substantially deformed by the impact force on the struck surface part 30 (frame 31). In the case of this configuration, a sensor (rim sensor) for detecting vibrations when the frame 31 is hit may be attached to the frame 31. In addition, for example, the frame 31 and the holder 32 may be separate members and connected to each other by a fastening means such as a screw, an adhesive, or the like.

The above embodiment illustrates a configuration in which the arm 25 is press-fitted into the press-fit hole 32*al* formed in the holder 32. For example, the holder 32 may also be fixed to the arm 25 using a known fixing means (means for fixing another member to a rod) such as a clamp.

Although the above embodiment illustrates a case where the impact sensor 33 is supported by the holder 32, the present invention is not necessarily limited thereto. For example, instead of supporting the impact sensor 33 with the holder 32, a part for supporting the impact sensor 33 may be provided separately from the holder 32 in the vicinity of the support position P1 of the electronic percussion instrument 3*a*. It should be noted that, where R is the radius of the electronic percussion instrument 3*a* (frame 31), "the vicinity of the support position P1" refers to a region of the radius R centered on the support position P1 when viewed from above.

Although the above embodiment illustrates a case where the upper surface of the plate 33*a* (the adhesive surface of the sensor 33*c*) is substantially parallel to the tangential direction of the struck surface part 30 at the contact position P2 between the back surface 30*b* of the struck surface part 30 and the cushion 33*d*, being substantially parallel refers to a state where the angle of the upper surface of the plate 33*a* with respect to the tangential direction is less than 5°. It should be noted that this angle may exceed 5°.

Although the above embodiment illustrates a case where the hit on the struck surface part 30 is detected by the sensor 33*c* which is a piezoelectric element, the hit on the struck surface part 30 may be detected by a known means such as an electrodynamic sensor or a capacitive sensor.

Although the above embodiment illustrates the plate 33*a* as an example of the base to which the sensor 33*c* and the cushion 33*d* are adhered, the present invention is not necessarily limited thereto. For example, the fixing portion 32*b* of the holder 32 (the bottom surface of the housing portion 32*b*1) may be used as the base, and the sensor 33*c* and the cushion 33*d* may be directly adhered to the base.

Although the above embodiment illustrates a case where the pedal devices Pa and Pb are separated from the stand 2, the present invention is not necessarily limited thereto. For example, the pedal devices Pa and Pb may be connected to the side surfaces of the base pipe 20 of the stand 2 (regions extending from the front surface to both left and right surfaces).

What is claimed is:

1. An electronic percussion instrument, comprising:
- a struck surface part formed into a dome shape and a net shape; and
- a frame being annular and connected to an outer edge of the struck surface part, wherein the frame comprises a recess which is formed on an inner circumferential surface of the frame and into which the outer edge of the struck surface part is fitted, and
- the outer edge of the struck surface part is not joined to an inner surface of the recess,
- wherein the struck surface part is formed into a disc shape with an outer diameter larger than an inner diameter of the frame, and the struck surface part is formed into the dome shape by deformation when the struck surface part is fitted into the recess.

2. The electronic percussion instrument according to claim 1, comprising:
- a support part for supporting the frame on a rod in a cantilevered manner, wherein the frame has elasticity that allows the frame to be bent and deformed by a hit in response to the struck surface part supported on the rod via the frame being hit.

3. The electronic percussion instrument according to claim 2, wherein the frame and the support part are integrally formed, and
- the support part comprises a press-fit hole for press-fitting the rod.

4. The electronic percussion instrument according to claim 2, comprising:
- a cushion having one end side in contact with a back surface of the struck surface part;
- a sensor provided on the other end side of the cushion and detecting vibrations when the struck surface part is hit; and
- a base having an adhesive surface to which the sensor is adhered,
- wherein a contact position between the back surface of the struck surface part and the cushion is near a support position where the support part is supported by the rod.

5. The electronic percussion instrument according to claim 4, wherein the frame and the support part are integrally formed, and
- the support part comprises a press-fit hole for press-fitting the rod.

6. The electronic percussion instrument according to claim 4, wherein the sensor is supported by the support part.

7. The electronic percussion instrument according to claim 6, wherein the adhesive surface of the base and a tangential direction of the struck surface part at the contact position of the cushion are substantially parallel.

8. The electronic percussion instrument according to claim 6, wherein the frame and the support part are integrally formed, and
- the support part comprises a press-fit hole for press-fitting the rod.

9. The electronic percussion instrument according to claim 4, wherein the adhesive surface of the base and a tangential direction of the struck surface part at the contact position of the cushion are substantially parallel.

10. The electronic percussion instrument according to claim 9, wherein the frame and the support part are integrally formed, and
- the support part comprises a press-fit hole for press-fitting the rod.

11. The electronic percussion instrument according to claim 1, wherein the struck surface part has rigidity to an extent that is capable of maintaining the dome shape in a state before being hit.

12. A percussion instrument set, comprising:
- a first electronic percussion instrument and a second electronic percussion instrument comprising the electronic percussion instrument according to claim 1; and
- a rod supporting the first electronic percussion instrument and the second electronic percussion instrument,
- wherein the first electronic percussion instrument and the second electronic percussion instrument comprise a support part that supports the frame on the rod in a cantilevered manner, and
- the frame of the first electronic percussion instrument and the frame of the second electronic percussion instrument have different elastic moduli.

13. The percussion instrument set according to claim 12, wherein the first electronic percussion instrument has an elastic modulus that prevents the frame from being bent and deformed by a hit in response to the struck surface part supported on the rod via the frame being hit, and
- the second electronic percussion instrument has an elastic modulus that allows the frame to be bent and deformed by a hit in response to the struck surface part supported on the rod via the frame being hit.

14. A method for securing a struck surface part to a frame of an electronic percussion instrument, wherein the struck surface part is formed into a dome shape and a net shape, and the frame is annular and connected to an outer edge of the struck surface part, the method comprising:

providing the struck surface part formed into a disc shape with an outer diameter larger part is fitted into a recess formed in an inner circumferential surface of the frame;

forming the struck surface part into the dome shape by deformation when the struck surface part is fitted into a recess formed in an inner circumferential surface of the frame; and securing the struck surface part in the dome shape to the frame by fitting the outer edge of the struck surface part into the recess without joining the outer edge of the struck surface to an inner surface of the recess.

* * * * *